US008397086B2

(12) United States Patent
Ikuwa

(10) Patent No.: US 8,397,086 B2
(45) Date of Patent: Mar. 12, 2013

(54) ELECTRONIC DEVICE

(75) Inventor: Akitsugu Ikuwa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 557 days.

(21) Appl. No.: 12/694,484

(22) Filed: Jan. 27, 2010

(65) Prior Publication Data
US 2010/0192010 A1    Jul. 29, 2010

(30) Foreign Application Priority Data

Jan. 29, 2009    (JP) ................................. 2009-017845

(51) Int. Cl.
     *G06F 1/26*      (2006.01)
(52) U.S. Cl. .................................. 713/300; 713/1; 713/2
(58) Field of Classification Search .................. 713/1, 2, 713/100, 300
See application file for complete search history.

(56) References Cited

U.S. PATENT DOCUMENTS

| 6,226,740 | B1 * | 5/2001 | Iga | 713/2 |
| 7,339,410 | B1 * | 3/2008 | Farrenkopf | 327/198 |
| 7,433,224 | B1 * | 10/2008 | Dunlap et al. | 365/154 |
| 2008/0086591 | A1 * | 4/2008 | Miyajima | 711/104 |

FOREIGN PATENT DOCUMENTS

| JP | 2000-047764 A | 2/2000 |
| JP | 2000-125372 A | 4/2000 |
| JP | 2002-318624 A | 10/2002 |

* cited by examiner

*Primary Examiner* — Paul Yanchus, III
(74) *Attorney, Agent, or Firm* — Global IP Counselors

(57) ABSTRACT

An electronic device includes a power supply circuit, a load circuit, a main device, a memory, and a holding circuit. The power supply circuit has a controlled output terminal that selectively supplies a second power supply voltage according to a power supply output control signal. The controlled output terminal supplies the second power supply voltage in response to the power supply output control signal being at a first level. The main device has a built-in power supply controlling microprocessor. The memory stores a program that is processed by the power supply controlling microprocessor. The holding circuit temporarily holds the power supply output control signal at the first level when the commercial power supply is connected to the power supply circuit such that the power supply circuit supplies the second power supply voltage from the controlled output terminal until the power supply controlling microprocessor loads the program from the memory and starts up.

18 Claims, 4 Drawing Sheets

ELECTRONIC DEVICE

CROSS-REFERENCE TO RELATED APPLICATIONS

This application claims priority to Japanese Patent Application No. 2009-017845 filed on Jan. 29, 2009. The entire disclosure of Japanese Patent Application No. 2009-017845 is hereby incorporated herein by reference.

BACKGROUND

1. Field of the Invention

The present invention generally relates to an electronic device. In particular, the present invention relates to an electronic device in which a commercial power supply is used, and which has a power supply circuit that supplies operating power to a load circuit.

2. Background Information

Conventional electronic devices such as television receivers and video recorders are operated by supplying operating power to some of the functions even when the main power is switched off, so that the operation of the electronic devices can be commenced in response to a power on signal or the like sent from a remote control device. A state in which the main power is off is called a standby state. With this type of electronic device, apart from the main device that controls the operation of the load circuit, there is also provided a power supply controlling microprocessor that controls the supply and shut-off of operating power to the various parts of the electronic device including the main device (See Japanese Laid-Open Patent Application Publication Nos. 2002-318624, 2000-125372, 2000-47764, for example). Also, the power supply controlling microprocessor operates regardless of whether the main power supply is on or off. In other words, the power supply circuit supplies operating power to the power supply controlling microprocessor regardless of whether the main power supply is on or off. Also, the power supply controlling microprocessor has a function of processing control signals sent from a remote control device. Further, the power supply controlling microprocessor monitors for the occurrence of abnormalities in the power supply circuit (i.e., power supply abnormalities), and if an power supply abnormality should occur, the microprocessor has the function of directing the power supply circuit to shut off the output of operating power to the load circuit (e.g., cut off the commercial power supply), among other such functions.

However, it is possible for the power supply controlling microprocessor to be built into a main device in order to lower the cost of an electronic device. With a conventional device in which the power supply controlling microprocessor is provided separately from the main device, upon input of a commercial power supply (e.g., upon connection), there is no problem as long as operating power is always supplied to the power supply controlling microprocessor. Specifically, there is no problem with a constitution in which the supply of operating power to the power supply controlling microprocessor is commenced when the commercial power supply is connected, and the supply of operating power to the load circuit or main device is controlled by the power supply controlling microprocessor with respect to the power supply circuit after the start-up of the power supply controlling microprocessor.

On the other hand, with a constitution in which a power supply controlling microprocessor is built into a main device, the power supply controlling microprocessor can not load programs from memory unless operating power is also supplied to the main device upon input of the commercial power supply. Specifically, with the constitution in which the power supply controlling microprocessor is built into the main device, operating power has to be supplied to the main device as well, and not just to the power supply controlling microprocessor, upon input of the commercial power supply. With a constitution in which operating power is constantly supplied to the main device as well upon input of the commercial power supply (e.g., upon connection), the operating power ends up being supplied to the main device when the electronic device is in standby mode, and this means that some of the power consumption by the electronic device is wasted. Also, even if the occurrence of a power supply abnormality in the power supply circuit is detected, the supply of operating power to the main device cannot be shut off.

SUMMARY

The present invention was conceived in light of the above-mentioned problems. One object of the present invention is to provide an electronic device with which it is possible to lower the cost of the electronic device in which a power supply controlling microprocessor is built into a main device, and to reduce the power consumption of the electronic device.

In accordance with one aspect of the present invention, an electronic device includes a power supply circuit, a load circuit, a main device, a memory, and a holding circuit. The power supply circuit has a continuous output terminal that continuously supplies a first power supply voltage when the electronic device is connected to a commercial power supply, and a controlled output terminal that selectively supplies a second power supply voltage according to a power supply output control signal. The controlled output terminal supplies the second power supply voltage in response to the power supply output control signal being at a first level. The controlled output terminal shuts off the second power supply voltage in response to the power supply output control signal being at a second level that is different from the first level. The load circuit is configured to operate using the second power supply voltage supplied from the controlled output terminal of the power supply circuit as an operating voltage of the load circuit. The main device is configured to control the load circuit. The main device has a built-in power supply controlling microprocessor that is configured to operate using the first power supply voltage supplied from the continuous output terminal of the power supply circuit as an operating voltage of the power supply controlling microprocessor. The memory is configured to store a program that is processed by the power supply controlling microprocessor. The holding circuit temporarily holds the power supply output control signal at the first level when the commercial power supply is connected to the power supply circuit such that the power supply circuit supplies the second power supply voltage from the controlled output terminal until the power supply controlling microprocessor loads the program from the memory and starts up.

With this electronic device, it is possible to provide an electronic device with which it is possible to lower the cost of the electronic device in which a power supply controlling microprocessor is built into a main device, and to reduce the power consumption of the electronic device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
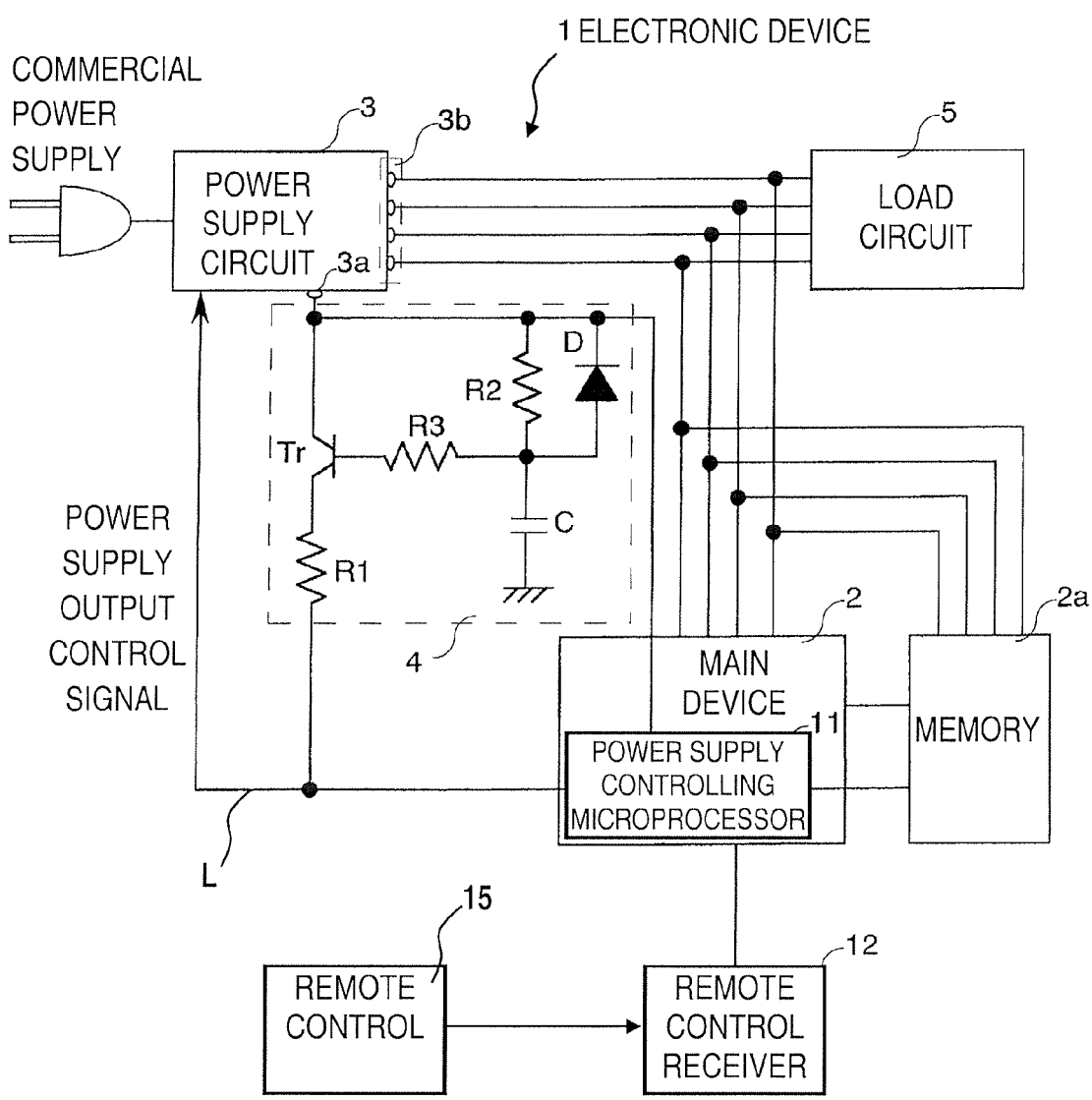
FIG. 1 is a diagram illustrating an electronic device in accordance with a first embodiment.

FIG. 1 is a diagram of an electronic device 1. The electronic device 1 includes a television receiver, video recorder, or the like with which operations including switching a main power supply on and off are performed with a remote control 15. The electronic device 1 includes a main device 2, a power supply circuit 3, a holding circuit 4, and a load circuit 5. If the electronic device 1 includes a television receiver, then the load circuit 5 includes a tuner circuit that receives television broadcast signals that are broadcast on tuned program channels, a display circuit that performs image display on a display component, an audio output circuit that outputs audio from a speaker, or the like. If the electronic device 1 includes a video recorder, then the load circuit 5 includes a tuner circuit that receives television broadcast signals that are broadcast on tuned program channels, a recording/reproduction circuit that records program data to a hard disk, a DVD, or another such recording medium, or reads and reproduces program data that has been recorded to a recording medium, or the like.

The power supply circuit 3 uses a commercial power supply (such as AC 100 V, AC 120 V, or 220-240 V) as an input (i.e., as a power source), and supplies operating power to the various components of the electronic device 1. The power supply circuit 3 has a continuous output terminal 3a that outputs a power supply voltage (e.g., firm power voltage, or first power supply voltage) continuously when the electronic device 1 is electrically connected to the commercial power supply (i.e., when the commercial power supply supplies electronic power to the electronic device), and a controlled output terminal 3b that switches a power supply voltage (e.g., second power supply voltage) between output and shut-off according to an inputted power supply output control signal. The power supply voltage outputted from the controlled output terminal 3b is supplied as the operating power to the load circuit 5 or the main device 2. The power supply voltage outputted from the continuous output terminal 3a is supplied as the operating power to the holding circuit 4 or a power supply controlling microprocessor (e.g., power supply monitoring IC) 11 built into the main device 2.

The power supply circuit 3 is equipped with the controlled output terminal 3b for every power supply voltage that is supplied as the operating power to the main device 2, the load circuit 5, and so forth. For example, four controlled output terminals 3b are provided, for four power supply voltages of 1.1 V, 1.8 V, 2.5 V, and 3.3 V, respectively.

The main device 2 and the power supply controlling microprocessor 11 that is built into the main device 2 load programs stored in a memory 2a and execute processing based on these programs. In particular, the main device 2 controls the operation of the load circuit 5. The memory 2a includes a flash memory, a DDR SDRAM (double data rate SDRAM), or the like. Also, as shown in FIG. 1, the memory 2a is provided separately from the main device 2. However, the memory 2a can also be built into the main device 2.

The power supply controlling microprocessor 11 has a detection function for detecting the occurrence of an abnormality in the power supply circuit 3, and a power supply output shut-off function for switching the power supply output control signal to a low level (e.g., second level) when the occurrence of an abnormality in the power supply circuit 3 is detected, and directing the power supply circuit 3 to shut off the output of the power supply voltage at the controlled output terminal 3b. Specifically, the power supply controlling microprocessor 11 has a power supply abnormality detection circuit (not shown) that monitors the output voltage for every controlled output terminal 3b of the power supply circuit 3 and detects whether or not an abnormality has occurred. More specifically, the power supply abnormality detection circuit detects an abnormality in the power supply circuit 3 by detecting whether or not the voltage inputted from a given controlled output terminal 3b to the main device 2 is within a predetermined suitable voltage range. The power supply controlling microprocessor 11 also outputs the power supply output control signal to the power supply circuit 3 via a signal line L. The power supply output control signal directs the power supply circuit 3 to output or shut off the power supply voltage at the controlled output terminal 3b. The power supply circuit 3 shuts off the output of the power supply voltage at the controlled output terminal 3b when the power supply output control signal is at the low level. On the other hand, the power supply circuit 3 outputs the power supply voltage at the controlled output terminal 3b when the power supply output control signal is at a high level (e.g., first level) that is higher than the low level. Here, the high level of the power supply output control signal means a voltage level that represents a logic "high". The low level of the poser supply output control signal means a voltage level that represents a logic "low".

The power supply controlling microprocessor 11 is also electrically connected to a remote control receiver 12 that receives control signals (main power supply on and off signals, channel changing signals, etc.) sent to the electronic device 1 from the remote control 15. The power supply controlling microprocessor 11 also has a function of processing the control signals received by the remote control receiver 12, and determining the operation to which the electronic device 1 is directed.

The holding circuit 4 is a circuit that, when the commercial power supply is electrically connected to the power supply circuit 3, forcibly and temporarily holds the power supply output control signal at the high level for a specific length of time. Specifically, the holding circuit 4 forcibly holds or pulls a voltage level of the signal line L to the high level for the specific length of time. The specific length of time over which the holding circuit 4 forcibly holds the power supply output control signal at the high level is slightly longer than the time it takes for the power supply controlling microprocessor 11 to load the program stored in the memory 2a and start up from the start of the supply of power.

The holding circuit 4 will now be described in detail. The holding circuit 4 includes resistors R1, R2 and R3, a transistor Tr, a capacitor C, and a diode D. The holding circuit 4 electrically connects the emitter of the transistor Tr to the continuous output terminal 3a of the power supply circuit 3. The transistor Tr is a p-type transistor. Also, the collector of the transistor Tr is electrically connected to the signal line L of the power supply output control signal inputted by the power supply controlling microprocessor 11 to the power supply circuit 3, via the resistor R1. The resistor R1 functions as a pull-up resistor. The holding circuit 4 also has a time constant circuit in which the resistor R2 and the capacitor C are connected in series, and the base of the transistor Tr is connected to the connection point between the capacitor C and the resistor R2 of the time constant circuit. The other end (e.g., end portion) of the resistor R2 of the time constant circuit (the terminal on the side not connected to the capacitor C) is connected to the continuous output terminal 3a of the power supply circuit 3. The other end (e.g., end portion) of the capacitor C of the time constant circuit (the terminal on the side not connected to the resistor R2) is connected to and grounded by a ground line. Furthermore, the diode D is connected in parallel with the resistor R2 of the time constant circuit. The orientation of the diode D is the direction in which the charge stored in the capacitor C is released when the voltage applied to the other end of the resistor R2 is lower than the charging voltage of the capacitor C.

The resistor R3 is a current limiting resistor that limits the current flowing to the base of the transistor Tr.

The holding circuit 4 is a circuit having the time constant circuit in which the resistor R2 and the capacitor C are directly connected in series, the other end of the resistor R2 is directly connected to the continuous output terminal 3a of the power supply circuit 3, and the other end of the capacitor C is grounded, and the transistor Tr in which the connection point between the resistor R2 and the capacitor C of the time constant circuit is connected to the base, and the power supply output control signal (e.g., the voltage level of the signal line L) is pulled up to the high level. This allows the power supply output control signal to be forcibly set to the high level for the specific length of time corresponding to the charging time of the capacitor C.

Next, the operation of the electronic device 1 will be described in detail.

First, the operation when the commercial power supply is connected to the electronic device 1 (the power supply circuit 3) will be described. When the commercial power supply is not connected (e.g., when the commercial power supply does not supply electronic power to the electronic device), no charge is stored in the capacitor C of the time constant circuit. Also, since no commercial power supply is connected, the power supply controlling microprocessor 11 built into the main device 2 does not operate.

When the commercial power supply is connected to the power supply circuit 3, the supply of the operating power begins to the holding circuit 4 and the power supply controlling microprocessor 11 that are electrically connected to the continuous output terminal 3a. At this point, the power supply controlling microprocessor 11 has not loaded a program stored in the memory 2a and started up, so whether the power supply output control signal applied to the power supply circuit 3 (e.g., the voltage level of the signal line L) is at a high or low level is uncertain.

Figure 2:
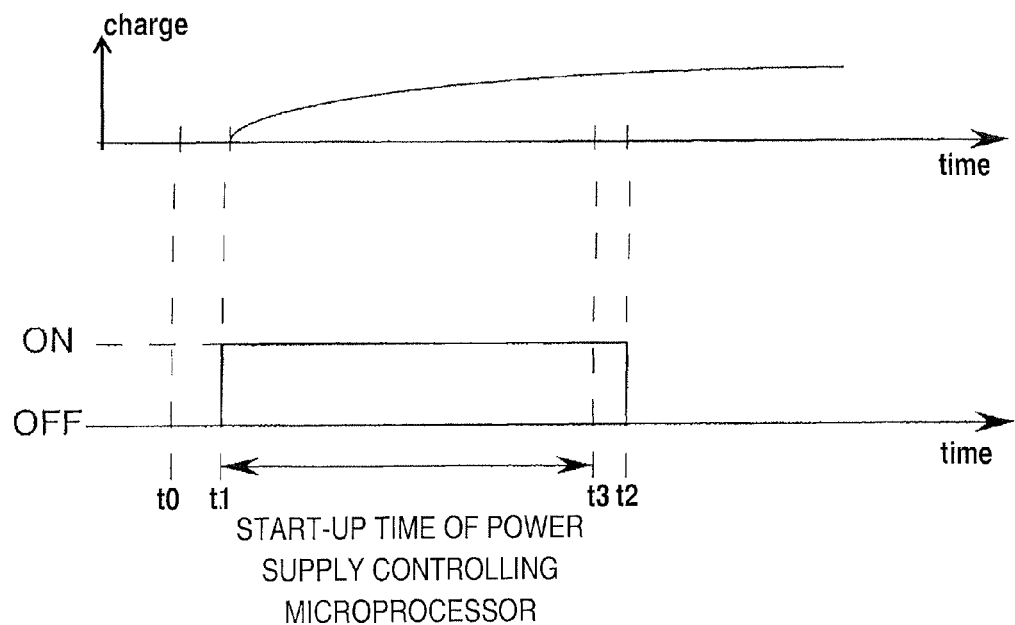
FIG. 2 is a timing chart of the electronic device illustrated in FIG. 1 when a commercial power supply is connected.

However, with the holding circuit 4, charging of the capacitor C of the time constant circuit is commenced, and the voltage at the both ends of the capacitor C (i.e., the charging voltage) varies as shown in the upper timing chart of FIG. 2. The upper timing chart of FIG. 2 is a timing chart of the change in the charge stored in the capacitor C. In the upper timing chart of FIG. 2, t0 is the timing at which the commercial power supply is connected to the power supply circuit 3, and t1 is the timing at which the output of the power supply voltage is commenced at the continuous output terminal 3a of the power supply circuit 3. Specifically, the period of t0 to t1 is the response lag of the power supply circuit 3.

Also, with the holding circuit 4, the transistor Tr is in its on state (see the lower timing chart of FIG. 2) until the charging voltage of the capacitor C reaches a certain level (approximately the base-emitter voltage) (that is, until the time t2 shown in FIG. 2 is reached). The lower timing chart of FIG. 2 is a timing chart of how the transistor Tr is switched on and off. Specifically, during the period of t1 to t2, the power supply output control signal applied to the power supply circuit 3 (e.g., the voltage level of the signal line L) is at the high level. Therefore, the power supply circuit 3 outputs the power supply voltage to the controlled output terminal 3b during the period of t1 to t2, and supplies the operating power to the main device 2, the memory 2a, the load circuit 5, and so forth from the controlled output terminal 3b.

The circuit constant of the time constant circuit here is determined so that the period from t1 to t2 is slightly (e.g., a few (1 or 2) seconds) longer than the time it takes for the power supply controlling microprocessor 11 to load the program from the memory 2a and start processing based on the program (i.e., start-up time). The time from t1 to t3 shown in the lower timing chart of FIG. 2 is the start-up time of the power supply controlling microprocessor 11. Accordingly, during the period from the connection of the commercial power supply until the power supply controlling microprocessor 11 has started up, the operating power can be forcibly supplied to the main device 2 or the memory 2a. Therefore, this does not lead to a situation in which the power supply controlling microprocessor 11 does not start up (cannot load the program from the memory 2a).

Also, since the transistor Tr turns off at the point when the time t2 is reached, the holding circuit 4 ends the operation in which the power supply output control signal is forcibly set to the high level. Since the power supply controlling microprocessor 11 has already started up at this point, though, subsequently the power supply controlling microprocessor 11 controls the power supply output control signal applied to the power supply circuit 3. For example, when the transistor Tr turns off at the point when the time t2 is reached, the power supply controlling microprocessor 11 switches the power supply output control signal applied to the power supply circuit 3 to the low level and direct the power supply circuit 3 to halt the supply of the operating power to the main device 2, the memory 2a, the load circuit 5, and so forth (to halt the output of the power supply voltage at the controlled output terminal 3b).

Also, if the power supply controlling microprocessor 11 receives a control signal indicating that the main power supply is to be turned on by the remote control receiver 12 after the power supply controlling microprocessor 11 has started up, then the power supply controlling microprocessor 11 switches the power supply output control signal applied to the power supply circuit 3 to the high level, and directs the power supply circuit 3 to supply the operating power to the main device 2, the memory 2a, the load circuit 5, and so forth (to output the power supply voltage at the controlled output terminal 3b). The power supply circuit 3 commences the output of the power supply voltage at the controlled output terminal 3b in response to the directive.

If the power supply controlling microprocessor 11 receives a control signal indicating that the channel is to be changed, etc., then the power supply controlling microprocessor 11 notifies the main device 2 to that effect. The main device 2 controls the load circuit 5 and changes the channel, etc., according to the notification from the power supply controlling microprocessor 11.

If the power supply controlling microprocessor 11 receives a control signal indicating that the main power supply is to be turned off by the remote control receiver 12, the power supply controlling microprocessor 11 switches the power supply output control signal applied to the power supply circuit 3 to the low level and direct the power supply circuit 3 to halt the supply of the operating power to the main device 2, the memory 2a, the load circuit 5, and so forth (to halt the output of the power supply voltage at the controlled output terminal 3b). The power supply circuit 3 halts the output of the power supply voltage at the controlled output terminal 3b in response to the directive.

Consequently, less of the power consumption by the electronic device 1 is wasted during standby.

Furthermore, if the power supply controlling microprocessor 11 detects an abnormality in the output voltage at the controlled output terminal 3b, then the power supply controlling microprocessor 11 switches the power supply output control signal applied to the power supply circuit 3 to the low level, and directs the power supply circuit 3 to halt the supply of the operating power to the main device 2, the memory 2a, the load circuit 5, and so forth. Therefore, when a voltage abnormality occurs, the output of the power supply voltage at the controlled output terminal 3b can be stopped quickly.

Next, the operation when the commercial power supply is shut off to the electronic device 1 (power supply circuit 3) will be described. When the commercial power supply is shut off to the electronic device 1, the power supply circuit 3 stops, and the supply of the operating power to the various components also stops. Consequently, the power supply controlling microprocessor 11 also stops.

Figure 3:
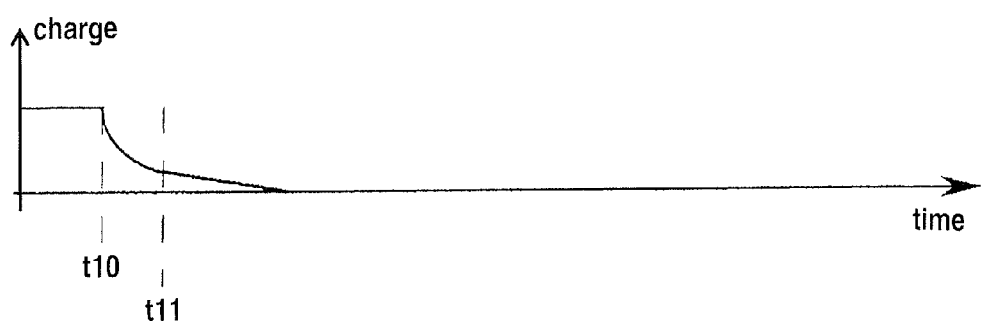
FIG. 3 is a timing chart of the electronic device illustrated in FIG. 1 when the commercial power supply is shut off.

At this point, the charge stored in the capacitor C is released via the diode D in the holding circuit 4 (see FIG. 3). FIG. 3 is a graph of the change in the charge stored in the capacitor C. In FIG. 3, t10 is the timing at which the commercial power supply is shut off, and t11 is the timing at which the output of the power supply voltage at the continuous output terminal 3a of the power supply circuit 3 is shut off. Specifically, the period of t10 to t11 is the response lag of the power supply circuit 3. Accordingly, when the commercial power supply is shut off from the electronic device 1 (the power supply circuit 3), nearly all of the charge stored in the capacitor C of the time constant circuit can be released.

Therefore, when the commercial power supply is reconnected to the electronic device 1 (the power supply circuit 3), as discussed above, during the time until the power supply controlling microprocessor 11 starts up, the operating power can be forcibly supplied by the operation of the holding circuit 4 to the main device 2 or the memory 2a.

Also, since the power supply controlling microprocessor 11 of the electronic device 1 is built into the main device 2, the cost of the electronic device 1 can be reduced.

With the electronic device 1, when the commercial power supply is connected to the power supply circuit 3, the holding circuit 4 temporarily holds the power supply output control signal (e.g., the voltage level of the signal line L) at the high level and directs the power supply circuit 3 to output the power supply voltage at the controlled output terminal 3b until the power supply controlling microprocessor 11 completes to load the program from the memory 2a to start up. In particular, at the holding circuit 4, charging of the capacitor C is commenced, and the p-type transistor Tr stays on until the voltage at the ends of the capacitor C reaches a certain level.

Therefore, the power supply output control signal applied to the power supply circuit 3 (e.g., the voltage level of the signal line L) is at the high level until the voltage at the ends of the capacitor C reaches the certain level. During this time, the power supply circuit 3 supplies operating power to the main device 2, the memory 2a, the load circuit 5, and so forth. Also, the charging of the capacitor C proceeds, and the power supply controlling microprocessor 11 starts up before the transistor Tr shuts off. Therefore, the power supply controlling microprocessor 11 built into the main device 2 can be started up when (or after) connected to the commercial power supply. Also, the operating power is only supplied to the main device 2 temporarily, until the power supply controlling microprocessor 11 starts up, so once the power supply controlling microprocessor 11 starts up, the supply of the operating power to the main device 2 and so forth is controlled by the power supply controlling microprocessor 11. In other words, the supply of the operating power to the main device 2 (other than the power supply controlling microprocessor 11) and so forth is shut off after the power supply controlling microprocessor 11 starts up. Therefore, the cost of the electronic device 1 is lowered, the power consumption by the electronic device 1 is reduced, and power supply abnormalities in the power supply circuit 3 can be properly controlled.

Second Embodiment

Figure 4:
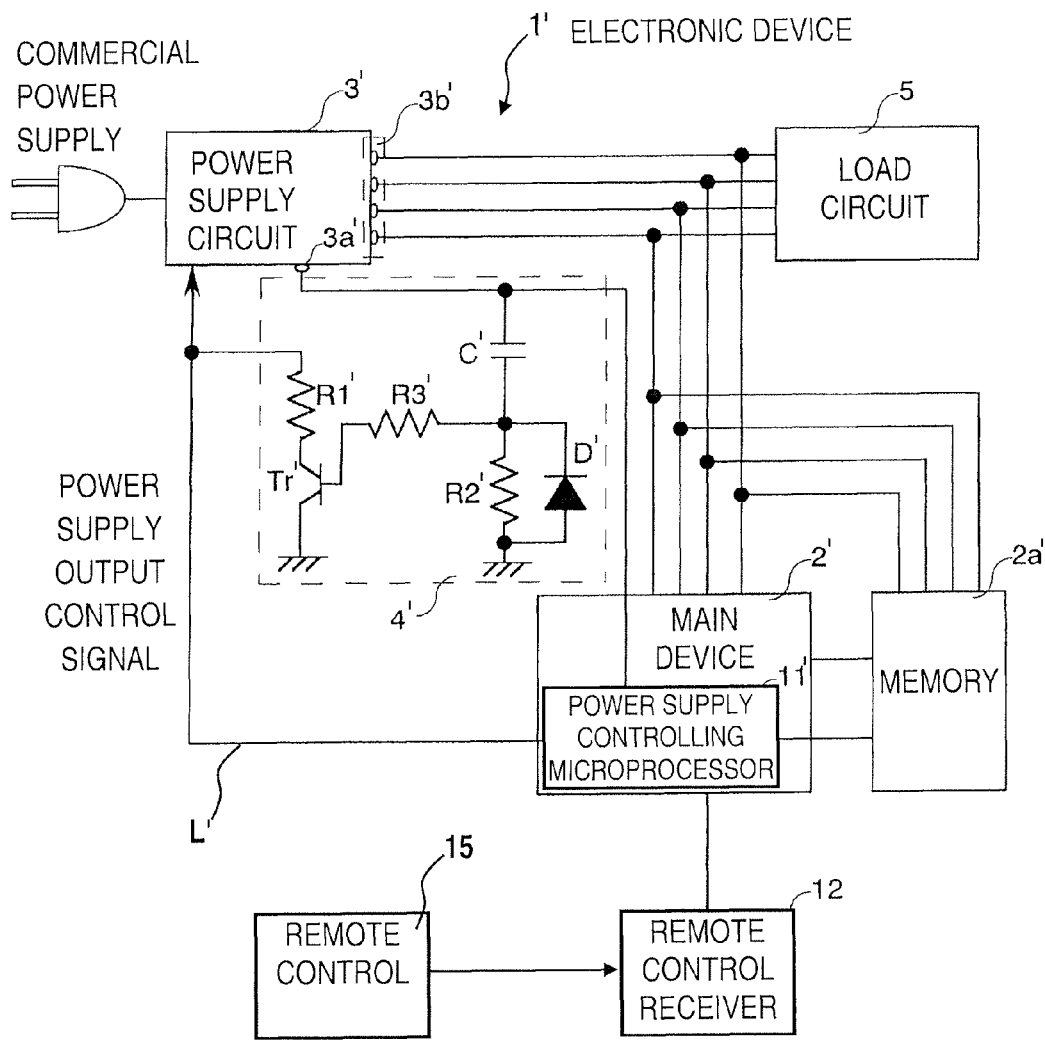
FIG. 4 is a diagram illustrating an electronic device in accordance with a second embodiment.
Figure 5:
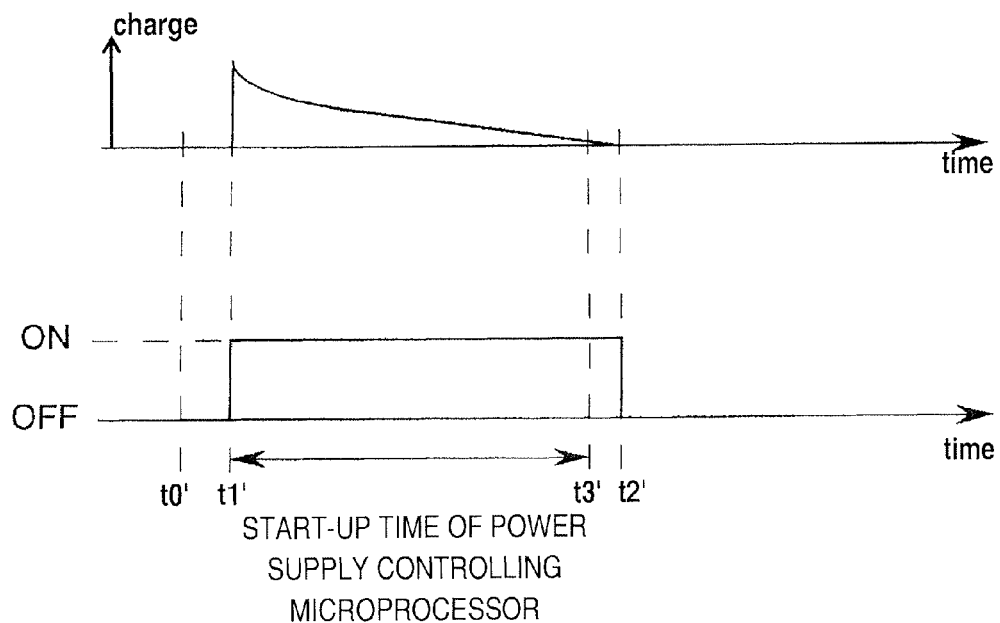
FIG. 5 is a timing chart of the electronic device illustrated in FIG. 4 when a commercial power supply is connected.
Figure 6:
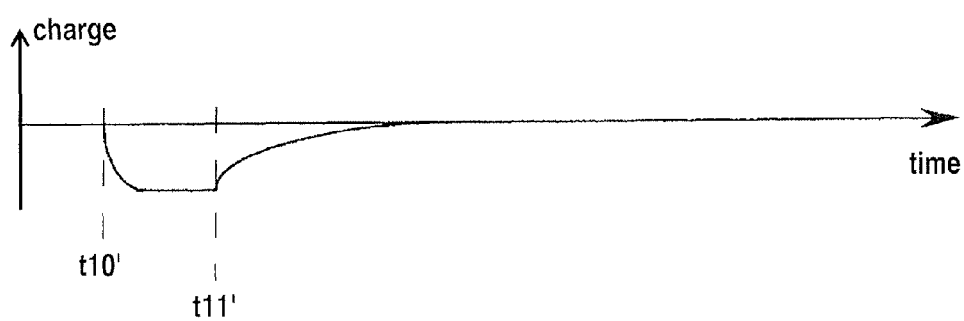
FIG. 6 is a timing chart of the electronic device illustrated in FIG. 4 when the commercial power supply is shut off.

Referring now to FIGS. 4 to 6, an electronic device 1' in accordance with a second embodiment will now be explained. In view of the similarity between the first and second embodiments, the parts of the second embodiment that are identical to the parts of the first embodiment will be given the same reference numerals as the parts of the first embodiment. The parts of the second embodiment that differ from the parts of the first embodiment will be indicated with a single prime ('). Moreover, the descriptions of the parts of the second embodiment that are identical or similar to the parts of the first embodiment may be omitted for the sake of brevity. The electronic device 1' includes a main device 2', a power supply circuit 3', a holding circuit 4', and a load circuit 5.

With the electronic device 1', the logic by which a power supply controlling microprocessor 11' of the main device 2' directs the power supply circuit 3' to shut off the output of the power supply voltage at a controlled output terminal 3b' of the power supply circuit 3' is reversed from the logic explained in the first embodiment. More specifically, the power supply output control signal is at a low level (e.g., first level) ordinarily, and is switched to a high level (e.g., second level) when the occurrence of an abnormality is detected in the power supply circuit 3'.

FIG. 4 is a diagram illustrating the electronic device 1'. The electronic device 1' has the holding circuit 4' with a different structure from the holding circuit 4 of the first embodiment. Another difference is that the power supply output control signal is at the low level ordinarily, and is switched to the high level when the occurrence of an abnormality is detected in the power supply circuit 3'. Here, components that are the same as those discussed above will not be described again.

The holding circuit 4' of the electronic device 1' is a circuit that forcibly and temporarily holds the power supply output control signal at the low level for a specific length of time when the commercial power supply is electrically connected to the power supply circuit 3'. Specifically, the holding circuit 4' forcibly holds or pulls a voltage level of the signal line L' to the low level for the specific length of time. The length of time over which the holding circuit 4' forcibly holds the power supply output control signal at the low level is slightly longer than the time it takes for the power supply controlling microprocessor 11' to load a program stored in the memory 2a' and start up from the start of the supply of power.

The holding circuit 4' includes resistors R1', R2' and R3', a transistor Tr', a capacitor C', and a diode D'. The holding circuit 4' grounds the emitter of the transistor Tr'. The transistor Tr' is an n-type transistor. Also, the collector of the transistor Tr' is connected to the signal line L' of the power supply output control signal inputted by the power supply controlling microprocessor 11' to the power supply circuit 3', via the resistor R1'. The resistor R1' functions as a pull-down resistor. The holding circuit 4' also has a time constant circuit in which the resistor R2' and the capacitor C' are connected in series, and the base of the transistor Tr' is electrically connected to the connection point between the capacitor C' and the resistor R2' of the time constant circuit. The other end of the resistor R2' of the time constant circuit (the terminal on the side not connected to the capacitor C') is directly connected to and grounded by a ground line. The other end of the capacitor C' of the time constant circuit (the terminal on the side not connected to the resistor R2') is directly connected to the continuous output terminal 3a' of the power supply circuit 3'. Furthermore, the diode D' is connected in parallel with the resistor R2' of the time constant circuit. The orientation of the diode D' is the direction in which the charge stored in the capacitor C' is released when the voltage applied to the other end of the capacitor C' is lower than the charging voltage of the capacitor C'.

The resistor R3' is a current limiting resistor that limits the current flowing to the base of the transistor Tr'.

The holding circuit 4' is a circuit having the time constant circuit in which the resistor R2' and the capacitor C' are connected in series, the other end of the capacitor C' is connected to the continuous output terminal 3a' of the power supply circuit 3', and the other end of the resistor R2' is grounded, and the transistor Tr' in which the connection point between the resistor R2' and the capacitor C' of the time constant circuit is connected to the base, and the power supply output control signal (e.g., the voltage level of the signal line L') is pulled down to the low level.

Next, the operation of the electronic device 1' will be described.

First, the operation when the commercial power supply is electrically connected to the electronic device 1' (the power supply circuit 3') will be described. When the commercial power supply is not connected, no charge is stored in the capacitor C' of the time constant circuit. Also, since no commercial power supply is connected, the power supply controlling microprocessor 11' built into the main device 2' does not operate.

When the commercial power supply is connected to the power supply circuit 3', the supply of the operating power begins to the holding circuit 4' and the power supply controlling microprocessor 11' connected to the continuous output terminal 3a'. At this point, the power supply controlling microprocessor 11' has not loaded a program stored in the memory 2a' and started up, so whether the power supply output control signal applied to the power supply circuit 3' (e.g., the voltage level of the signal line L') is at a high or low level is uncertain.

However, with the holding circuit 4', charging of the capacitor C' of the time constant circuit is commenced, and the voltage at the ends of the capacitor C' (i.e., the charging voltage) varies as shown in the upper timing chart of FIG. 5. The upper timing chart of FIG. 5 is a timing chart of the change in the charge stored in the capacitor C'. In the upper timing chart of FIG. 5, t0' is the timing at which the commercial power supply is connected to the power supply circuit 3', and t1' is the timing at which the output of the power supply voltage is commenced at the continuous output terminal 3a' of the power supply circuit 3'. Specifically, the period of t0' to t1' is the response lag of the power supply circuit 3'. The change in the charged stored in the capacitor C' of the holding circuit 4' is the same as the capacitor C of the holding circuit 4 in the first embodiment.

Also, with the holding circuit 4', the transistor Tr' is in its on state (see the lower timing chart of FIG. 5) until the charging voltage of the capacitor C' reaches a certain level (approximately the base-emitter voltage) (that is, until the time t2' shown in FIG. 5 is reached). The lower timing chart of FIG. 5 is a timing chart of how the transistor Tr' is switched on and off Specifically, during the period of t1' to t2', the power supply output control signal applied to the power supply circuit 3' (e.g., the voltage level of the signal line L') is at the low level. Therefore, the power supply circuit 3' outputs the power supply voltage to the controlled output terminal 3b' during the period of t1' to t2', and supplies the operating power to the main device 2', the memory 2a', the load circuit 5, and so forth.

The circuit constant of the time constant circuit here is determined so that the period from t1' to t2' is slightly longer than the time it takes for the power supply controlling microprocessor 11' to load the program from the memory 2a' and start processing based on the program (i.e., start-up time). The time from t1' to t3' shown in the lower timing chart of FIG. 5 is the start-up time of the power supply controlling microprocessor 11'. Accordingly, during the period from the connection of the commercial power supply until the power supply controlling microprocessor 11' has started up, the operating power can be forcibly supplied to the main device 2' or the memory 2a'. Therefore, this does not lead to a situation in which the power supply controlling microprocessor 11' does not start up (cannot load the program from the memory 2a').

Also, since the transistor Tr' is turned off at the point when the time t2' is reached, the holding circuit 4' ends the operation in which the power supply output control signal is forcibly set to the low level. Since the power supply controlling microprocessor 11' has already started up at this point, though, subsequently the power supply controlling microprocessor 11' controls the power supply output control signal applied to the power supply circuit 3'. For example, when the transistor Tr turns off at the point when the time t2' is reached, the power supply controlling microprocessor 11' switches the power supply output control signal applied to the power supply circuit 3' to the high level and direct the power supply circuit 3' to halt the supply of the operating power to the main device 2', the memory 2a', the load circuit 5, and so forth (to halt the output of the power supply voltage at the controlled output terminal 3b').

Also, if the power supply controlling microprocessor 11' receives a control signal indicating that the main power supply is to be turned on by the remote control receiver 12 after the power supply controlling microprocessor 11' has started up, then the power supply controlling microprocessor 11' switches the power supply output control signal applied to the power supply circuit 3' to the low level, and directs the power supply circuit 3' to supply the operating power to the main device 2', the memory 2a', the load circuit 5, and so forth (to output the power supply voltage at the controlled output terminal 3b'). The power supply circuit 3' commences the output of the power supply voltage at the controlled output terminal 3b' in response to the directive.

If the power supply controlling microprocessor 11' receives a control signal indicating that the channel is to be changed, etc., then the power supply controlling microprocessor 11' notifies the main device 2' to that effect. The main device 2' controls the load circuit 5 and changes the channel, etc., according to the notification from the power supply controlling microprocessor 11'.

If the power supply controlling microprocessor 11' receives a control signal indicating that the main power supply is to be turned off by the remote control receiver 12, then the power supply controlling microprocessor 11' switches the power supply output control signal applied to the power supply circuit 3' to the high level and direct the power supply circuit 3' to halt the supply of the operating power to the main device 2', the memory 2a', the load circuit 5, and so forth (to halt the output of the power supply voltage at the controlled output terminal 3b'). The power supply circuit 3' halts the output of the power supply voltage at the controlled output terminal 3b' in response to the directive.

Consequently, less of the power consumption by the electronic device 1' is wasted during standby.

Furthermore, if the power supply controlling microprocessor 11' detects an abnormality in the output voltage at the controlled output terminal 3b', then the power supply controlling microprocessor 11' switches the power supply output control signal applied to the power supply circuit 3' to the high level, and directs the power supply circuit 3' to halt the supply of the operating power to the main device 2', the memory 2a', the load circuit 5, and so forth. Therefore, when a voltage abnormality occurs, the output of the power supply voltage at the controlled output terminal 3b' can be stopped quickly.

Next, the operation when the commercial power supply is shut off to the electronic device 1' (power supply circuit 3') will be described. When the commercial power supply is shut off to the electronic device 1', the power supply circuit 3' stops, and the supply of the operating power to the various components also stops. Consequently, the power supply controlling microprocessor 11' also stops.

At this point, the charge stored in the capacitor C' is released via the diode D' in the holding circuit 4' (see FIG. 6). FIG. 6 is a graph of the change in the charge stored in the capacitor C'. The change in the charge stored in the capacitor C' of the holding circuit 4' is the same as that of the holding circuit 4 in the first embodiment. In FIG. 6, t10' is the timing at which the commercial power supply is shut off, and t11' is the timing at which the output of the power supply voltage at the continuous output terminal 3a' of the power supply circuit 3' is shut off. Specifically, the period of t10' to t11' is the response lag of the power supply circuit 3'. Accordingly, when the commercial power supply is shut off from the electronic device 1' (the power supply circuit 3'), nearly all of the charge stored in the capacitor C' of the time constant circuit can be released.

Therefore, when the commercial power supply is reconnected to the electronic device 1' (the power supply circuit 3'), as discussed above, during the time until the power supply controlling microprocessor 11' starts up, the operating power can be forcibly supplied by the operation of the holding circuit 4' to the main device 2' or the memory 2a'.

Thus, the electronic device 1' shown in FIG. 4 has the same action and effect as the electronic device 1 of the first embodiment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An electronic device comprising:
    a power supply circuit having a continuous output terminal that continuously supplies a first power supply voltage while the electronic device is connected to a commercial power supply, and a controlled output terminal that selectively supplies a second power supply voltage according to a power supply output control signal, the controlled output terminal supplying the second power supply voltage in response to the power supply output control signal being at a first level, the controlled output terminal shutting off the second power supply voltage in response to the power supply output control signal being at a second level that is different from the first level;
    a load circuit configured to operate using the second power supply voltage supplied from the controlled output terminal of the power supply circuit as an operating voltage of the load circuit;
    a main device configured to control the load circuit, the main device having a built-in power supply controlling microprocessor that is configured to operate using the first power supply voltage supplied from the continuous output terminal of the power supply circuit as an operating voltage of the power supply controlling microprocessor;
    a memory configured to store a program that is processed by the power supply controlling microprocessor; and
    a holding circuit configured to temporarily hold the power supply output control signal at the first level until a predetermined time period elapses after the commercial power supply is connected to the power supply circuit such that the power supply circuit supplies the second power supply voltage from the controlled output terminal until the power supply controlling microprocessor loads the program from the memory and starts up, with the predetermined time period being longer than a time period over which the power supply controlling microprocessor loads the program from the memory and starts up, the holding circuit being further configured to stop holding the power supply output control signal at the first level automatically in response to the predetermined time period elapsing after the commercial power supply is connected to the power supply circuit such that the controlled output terminal of the power supply circuit shuts off the second power supply voltage.

2. The electronic device according to claim 1, wherein the first level of the power supply output control signal is higher than the second level of the power supply output control signal.

3. The electronic device according to claim 1, wherein the first level of the power supply output control signal is lower than the second level of the power supply output control signal.

4. The electronic device according to claim 1, wherein the power supply controlling microprocessor is connected to the power supply circuit via a signal line, the power supply output control signal being inputted to the power supply circuit through the signal line, the holding circuit has an output line that is connected to the signal line at a merging point of the signal line.

5. An electronic device comprising:

a power supply circuit having a continuous output terminal that continuously supplies a first power supply voltage when the electronic device is connected to a commercial power supply, and a controlled output terminal that selectively supplies a second power supply voltage according to a power supply output control signal, the controlled output terminal supplying the second power supply voltage in response to the power supply output control signal being at a first level, the controlled output terminal shutting off the second power supply voltage in response to the power supply output control signal being at a second level that is different from the first level, with the first level of the power supply output control signal being higher than the second level of the power supply output control signal;

a load circuit configured to operate using the second power supply voltage supplied from the controlled output terminal of the power supply circuit as an operating voltage of the load circuit;

a main device configured to control the load circuit, the main device having a built-in power supply controlling microprocessor that is configured to operate using the first power supply voltage supplied from the continuous output terminal of the power supply circuit as an operating voltage of the power supply controlling microprocessor;

a memory configured to store a program that is processed by the power supply controlling microprocessor; and a holding circuit configured to temporarily hold the power supply output control signal at the first level when the commercial power supply is connected to the power supply circuit such that the power supply circuit supplies the second power supply voltage from the controlled output terminal until the power supply controlling microprocessor loads the program from the memory and starts up, the holding circuit further including a time constant circuit having a resistor and a capacitor that is connected to the resistor in series, the resistor having an end portion that is connected to the continuous output terminal of the power supply circuit, the capacitor having an end portion that is grounded, and a transistor having a base that is connected to a connection point between the resistor and the capacitor of the time constant circuit, the transistor being configured to pull a voltage of a signal line through which the power supply output control signal is inputted to the power supply circuit to the first level.

6. The electronic device according to claim 5, wherein the transistor of the holding circuit includes a p-type transistor, the transistor further having an emitter that is connected to the continuous output terminal of the power supply circuit, and a collector that is connected to the signal line via a pull-up resistor.

7. The electronic device according to claim 6, wherein the power supply controlling microprocessor of the main device is further configured to detect an occurrence of an abnormality in the power supply circuit, switch the power supply output control signal to the second level when the occurrence of the abnormality in the power supply circuit is detected, and direct the power supply circuit to shut off the second power supply voltage from the controlled output terminal.

8. The electronic device according to claim 5, wherein the holding circuit further includes a diode that is connected in parallel with the resistor of the time constant circuit such that the diode releases a charge stored in the capacitor.

9. The electronic device according to claim 6, wherein the holding circuit further includes a diode that is connected in parallel with the resistor of the time constant circuit such that the diode releases a charge stored in the capacitor.

10. The electronic device according to claim 7, wherein the holding circuit further includes a diode that is connected in parallel with the resistor of the time constant circuit such that the diode releases a charge stored in the capacitor.

11. The electronic device according to claim 7, wherein the power supply controlling microprocessor of the main device is further configured to switch the power supply output control signal according to a control signal sent from a remote control device.

12. An electronic device comprising:

a power supply circuit having a continuous output terminal that continuously supplies a first power supply voltage when the electronic device is connected to a commercial power supply, and a controlled output terminal that selectively supplies a second power supply voltage according to a power supply output control signal, the controlled output terminal supplying the second power supply voltage in response to the power supply output control signal being at a first level, the controlled output terminal shutting off the second power supply voltage in response to the power supply output control signal being at a second level that is different from the first level, with the first level of the power supply output control signal being lower than the second level of the power supply output control signal;

a load circuit configured to operate using the second power supply voltage supplied from the controlled output terminal of the power supply circuit as an operating voltage of the load circuit;

a main device configured to control the load circuit, the main device having a built-in power supply controlling microprocessor that is configured to operate using the first power supply voltage supplied from the continuous output terminal of the power supply circuit as an operating voltage of the power supply controlling microprocessor;

a memory configured to store a program that is processed by the power supply controlling microprocessor; and a holding circuit configured to temporarily hold the power supply output control signal at the first level when the commercial power supply is connected to the power supply circuit such that the power supply circuit supplies the second power supply voltage from the controlled output terminal until the power supply controlling microprocessor loads the program from the memory and starts up, the holding circuit further including
- a time constant circuit having a resistor and a capacitor that is connected to the resistor in series, the resistor having an end portion that is grounded, the capacitor having an end portion that is connected to the continuous output terminal of the power supply circuit, and
- a transistor having a base that is connected to a connection point between the resistor and the capacitor of the time constant circuit, the transistor being configured to pull a voltage of a signal line through which the power supply output control signal is inputted to the power supply circuit to the first level.

13. The electronic device according to claim 12, wherein the transistor of the holding circuit includes a n-type transistor, the transistor further having an emitter that is grounded, and a collector that is connected to the signal line via a pull-down resistor.

14. The electronic device according to claim 13, wherein the power supply controlling microprocessor of the main device is further configured to detect an occurrence of an abnormality in the power supply circuit, switch the power supply output control signal to the second level when the occurrence of the abnormality in the power supply circuit is detected, and direct the power supply circuit to shut off the second power supply voltage from the controlled output terminal.

15. The electronic device according to claim 12, wherein the holding circuit further includes a diode that is connected in parallel with the resistor of the time constant circuit such that the diode releases a charge stored in the capacitor.

16. The electronic device according to claim 13, wherein the holding circuit further includes a diode that is connected in parallel with the resistor of the time constant circuit such that the diode releases a charge stored in the capacitor.

17. The electronic device according to claim 12, wherein the holding circuit further includes a diode that is connected in parallel with the resistor of the time constant circuit such that the diode releases a charge stored in the capacitor.

18. The electronic device according to claim 12, wherein the power supply controlling microprocessor of the main device is further configured to switch the power supply output control signal according to a control signal sent from a remote control device.

\* \* \* \* \*